M. V. Cummings,
Oscillating Steam Engine.

N° 67,511. Patented Aug. 6, 1867.

Witnesses:
Samuel N. Piper
G. H. Andrews.

Inventor:
Marcellus. V. Cummings.
by his attorney

United States Patent Office

MARCELLUS V. CUMMINGS, OF WINTHROP, MAINE.

Letters Patent No. 67,511, dated August 6, 1867.

---

IMPROVEMENT IN OSCILLATING ENGINES.

---

The Schedule referred to in these Letters Patent and making part of the same.

---

TO ALL PERSONS TO WHOM THESE PRESENTS MAY COME:

Be it known that I, MARCELLUS V. CUMMINGS, of Winthrop, in the county of Kennebec, and State of Maine, have invented a new and useful Improvement in Oscillating Steam Engines; and do hereby declare the same to be fully described in the following specification, and represented in the accompanying drawings, of which—

Figure 2:
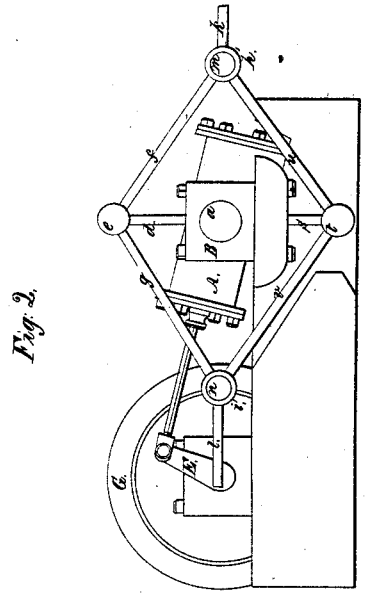
Figure 4:
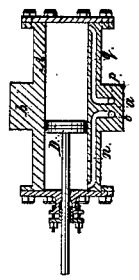
Figure 1:
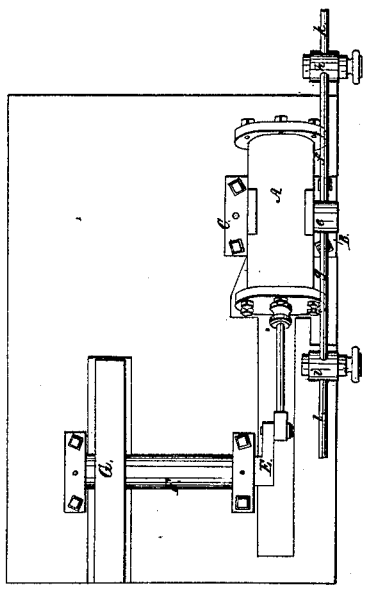
Figure 3:
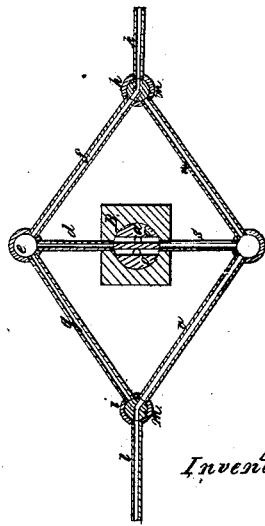

Figure 1 is a top view, and
Figure 2 a side elevation of an engine provided with my invention.
Figure 3 is a vertical section of its trunnion and the bearing and pipes and cocks thereon.
Figure 4 is a horizontal section taken through the trunnion and cylinder.

In such drawings, A denotes the cylinder, having at its middle two trunnions, $a\,b$, projecting in opposite directions, and resting in boxes or bearings B C. The piston D of the cylinder is applied directly to the wrist of a crank, E, of a horizontal shaft, F, on which there may be a fly-wheel or pulley, G. A pipe or conduit, $d$, leads upward from the bearing of the trunnion $a$ to a hollow joint connection, $c$, from which extend, in opposite directions, two pipes, $f\,g$, which open at their outer ends into the cases of two stop-cocks $h\,i$. An induction pipe, $k$, leads into the cock $h$, and an eduction pipe or passage, $l$, leads out of the cock $i$. The plugs $m\,n$, of the two stop-cocks have bent passages extending through them, as represented in the drawings. Furthermore there are two passages, $o\,p$, made vertically through the trunnion $a$, and on opposite sides of its axis, and in the plane of the pipe $d$. From these passages ports or other passages, $q\,r$, lead to the opposite ends of the interior space of the cylinder, the whole being as represented as the drawings. Furthermore, another pipe, $s$, leads out of the trunnion-bearing in the box B and into a pipe connection, $t$, from which two other pipes, $u\,v$, branch to and open into the cases of the cocks $h\,i$. By revolving the plug $m$ of the cock $h$, steam from the pipe $k$ may be made to pass either into the pipe $f$ or into the pipe $u$, it being shut off from one while passing into the other of such pipes $f\,u$. So by turning the plug $n$ of the cock $i$, communication between either of the pipes $g\,v$ and the pipe $l$ may be caused to take place, one of the pipes $g\,v$ being out of communication with the pipe $l$ when the other is in communication with it. The passages $o\,r$ of the trunnion $a$ are to be so arranged that when they are vertical communication between the pipes $d\,s$ and the trunnion-bearing will be arrested; also, so that the cylinder when vibrated in either direction, shall bring one of the passages $o\,p$ into conjunction with the pipe $d$, and the other into conjunction with the pipe $s$.

From the above it will be seen that when the plugs of the cocks are turned so as to bring the pipe $k$ into communication with the pipe $f$, and the pipe $v$ into communication with the pipe $l$, and steam is allowed into the pipe $k$, such steam will pass through the pipes $f$ and $d$. Now, if the forward end of the cylinder be depressed a little, so as to open communication between the pipe $d$ and the passage $p$, and also between the passage $o$ and the pipe $s$, the steam will rush into the rear part of the cylinder, and will drive the piston ahead. The exhaust will pass through the passages $r\,o$ and the pipes $s$, $v$, and $l$. As soon as the crank may have passed the dead-point, or directly after such passage, the trunnion $a$ will be moved by the cylinder so as to bring the passage $o$ into communication with the pipe $d$, and also the passage $p$ into communication with the pipe $s$, in which case the piston will be driven back in the cylinder. By turning the plugs $m\,n$ so as to cause the pipe $k$ to open into the pipe $u$, and the pipe $g$ to open into the pipe $l$, the movement of the piston may be reversed. When it may not be desirable to have the engine capable of being reversed, the pipes $f\,g$ and $u\,v$, and the stop-cocks $h\,i$, may be dispensed with, the said pipes being essential when the engine is applied to or makes part of a locomotive.

I claim the combination as well as the arrangement of the trunnion-passages $o\,p$ with the cylinder-ports $q\,r$, and the box B, and its induction and eduction passages or pipes $d\,s$.

I also claim the combination as well as the arrangement of the two cocks $h\,i$ and the conduits $f\,g\,u\,v$ with the conduits $d\,s$, the box B, the trunnion $a$, its passages $o\,p$, and the ports $q\,r$ of the cylinder, the whole being to operate substantially as specified.

MARCELLUS V. CUMMINGS.

Witnesses:
R. H. EDDY,
F. P. HALE, Jr.